United States Patent [19]

Shindow et al.

[11] 4,410,267

[45] Oct. 18, 1983

[54] HAND-HELD LENS METER

[75] Inventors: Osamu Shindow, Tokyo; Ikuzo Okamoto, Tamagawa; Takeshi Machida, Sakado; Hiroshi Koyama, Tokyo, all of Japan

[73] Assignee: Asahi Kogaku Kogyo Kabushiki Kaisha, Tokyo, Japan

[21] Appl. No.: 237,783

[22] Filed: Feb. 24, 1981

[30] Foreign Application Priority Data

Feb. 26, 1980 [JP] Japan .............................. 55-23821[U]
Oct. 18, 1980 [JP] Japan ........................... 55-148793[U]

[51] Int. Cl.³ ............................................... G01B 9/00
[52] U.S. Cl. .................................... 356/124; 356/125
[58] Field of Search ........................ 356/124, 125, 127

[56] References Cited

U.S. PATENT DOCUMENTS 3,002,285 12/1961 Wright ................................ 356/125

FOREIGN PATENT DOCUMENTS 124480 3/1949 Sweden ............................. 356/124

Primary Examiner—Bruce Y. Arnold
Attorney, Agent, or Firm—Sughrue, Mion, Zinn, Macpeak and Seas

[57] ABSTRACT

A hand-held lens meter including first and second optical systems mounted in a substantially Y-shaped hand-holdable body is disclosed. The first optical system includes a target, a lens rest and an objective lens. The target is slidably mounted in a grip portion of the lens meter body while the two optical systems are mounted in the upper legs thereof. The second optical system includes a relay lens, a focusing screen, an eyepiece lens and first and second reflecting surfaces which may be consituted either by first and second mirrors or a pentagonal prism. A prism is provided preferably as the reflecting surface of the first optical system with the prism having an optical path length longer than the outside diameter of the objective lens. The target is slidably moved along the optical axis in response to rotation of a power-measuring dial which is calibrated in terms of the powers of lenses to be measured.

13 Claims, 9 Drawing Figures

HAND-HELD LENS METER

BACKGROUND OF THE INVENTION

The present invention relates to lens meters for measuring the spherical power, the cylindrical power, the cylindrical axis angle and the prism power of an ophthalmic lens.

Examples of lens meters of this type are a telescopic lens meter in which the main optical system is arranged along a straight line and the lower portion of the body holding the optical system is formed as a stand with which the lens meter can be supported on a table or bench and a projection type lens meter in which an enlarging projection system is employed for the observing section. Both of these lens meters are so designed to be used on a table or bench.

These conventional lens meters are disadvantageous in the following points. As they are heavy and bulky, these lens meters are inconvenient for the optician in the case where he must visit a customer for the measurement of ophthalmic lenses. Even in his shop, he can use them only at their particular installation locations. Furthermore, since the conventional lens meters' operating members are arranged to be operated with the meter set on a bench, it is impossible to perform measurements with the lens meter held in one hand.

FIG. 1 shows essential components of a conventional telescopic lens meter. The lens meter has an optical system including a light source 1, a target 2, an objective lens 3, a relay lens 4, a focusing screen 5 and an eyepiece lens 6 all of which are arranged along a single straight line. A lens 8 to be measured is held on a lens rest 7 with a lens holder 9 urged elastically. Provided on the side of the body 10 are a power-measuring dial 11 adaphted to move the target 2 in the direction of the optical axis and a knob 13 for controlling the position of a lens supporting plate 12 adapted to support the lens 8 to be examined. Furthermore, a power-indicating optical system (not shown) is provided in the body 10, which is used to read through the eyepiece lens 6 a lens power scale which is operated in association with the target 2.

The operation of the conventional telescopic lens meter thus constructed will be described.

A lever 14 integral with the lens holder 9 is lifted to place the lens 8 to be measured between the lens rest 7 and the lens holder 9. Under this condition, the knob 13 is turned so that the lens 8 is held with the lens supporting plate 12 abutted against the edge of the lens. Then, the dial 11 is turned to move the target 2 back and forth so that the image of the target 2 is formed on the focusing screen 5. The graduations and the configuration of the target 2 are observed through the eyepiece 6 to measure the power, the orientation of cylinder axis and prism power of the lens 8.

As is clear from the above description, in the conventional lens meter, the main optical system thereof is an aligned type and an optical system for indicating the lens power is also incorporated into the instrument. With this construction, it is impossible to operate the various operating members with the body held in one hand. Furthermore, the conventional lens meter cannot easily be transported as it is bulky and heavy. Thus, the conventional lens meter is disadvantageous in that it is difficult to perform various operations with the lens meter held in one hand. A projection type lens meter also suffers from the same difficulties because the image is enlarged by increasing the focal length of the relay lens 4 and the optical path from the relay lens 4 to the focusing screen 5.

SUMMARY OF THE INVENTION

Accordingly, an object of the invention is to provide a lens meter in which the above-described difficulties accompanying a conventional lens meter are eliminated. More specifically, an object of the invention is to provide an improved lens meter in which the optical axis is bent with reflecting means and in which a grip and other relevant members are arranged so that they can be readily operated in a small space thereby to provide a lens meter which is small and light enough to be easily carried with the operator and is operable while being held in one hand.

These, as well other objects of the invention, are met by a hand-held lens meter including a target, an objective lens, a rest adapted to receive a lens to be measured, a relay lens, a focusing screen, and an eyepiece lens disposed along a bent optical axis. A power-measuring dial is operatively coupled to slidably move the target along the optical axis. Reflecting means is disposed between the rest and the focusing screen for reflecting light an even number of times. A prism having an optical path longer than the outside diameter of the objective lens and having at least one light reflecting surface is provided between the rest and the objective lens. All of these components are mounted so that the assembled lens meter can be held by the hand. In one embodiment, the light reflecting means consists of two mirrors while in another embodiment the light reflecting means is a pentagonal prism.

Further, the objects of the invention are met by a hand-held lens meter including first and second optical systems mounted in a substantially Y-shaped body. The first optical system includes a target, a lens rest and a first reflecting surface between the target and lens rest while the second optical system includes an eyepiece lens and second and third reflecting surfaces positioned between the lens rest and the eyepiece lens. Further, the first optical system may include an objective lens and the second optical system a relay lens. The substantially Y-shaped body has a first hollow portion which receives the lens to be measured and a grip section including an target sliding member below the first hollow portion. A second hollow portion is provided which receives a power source such as a dry cell battery. A power-measuring dial is rotatably mounted on one side of the body and is operatively coupled to cause the target sliding member to slidably move along the optical axis of the meter in response to rotation of the power-measuring dial. The power-measuring dial is furnished with calibration marks corresponding to powers of lenses to be measured. A lens holder is slidably mounted on the Y-shaped body which has a first end protruding so as to confront the lens rest and a second end protruding from an upper part of the grip section with the lens holder being elastically urged to hold the lens to be measured.

BREIF DESCRIPTION OF THE DRAWINGS

FIGS. 2 through 5 are diagrams showing a preferred embodiment of a lens meter according to the invention of which FIG. 2 is a sectional side view of the lens meter, FIG. 3 is a top view of the lens meter, FIG. 4 is a side view of the lens meter, and FIG. 5 is a side view of the lens meter while in operation;

DESCRIPTION OF THE PREFERRED EMBODIMENTS

Figure 1:
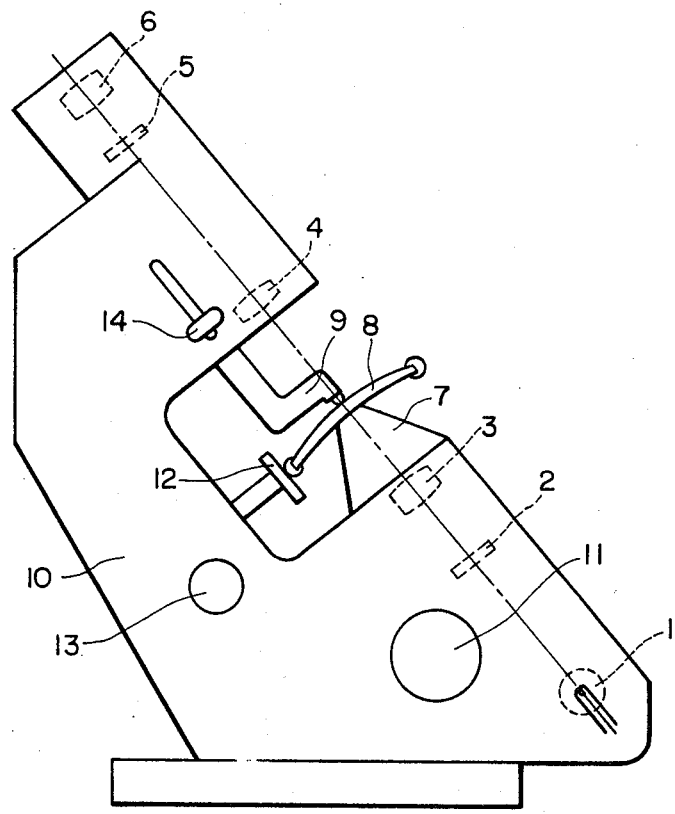
FIG. 1 is a side view of essential components of a conventional telescopic lens meter.
Figure 2:
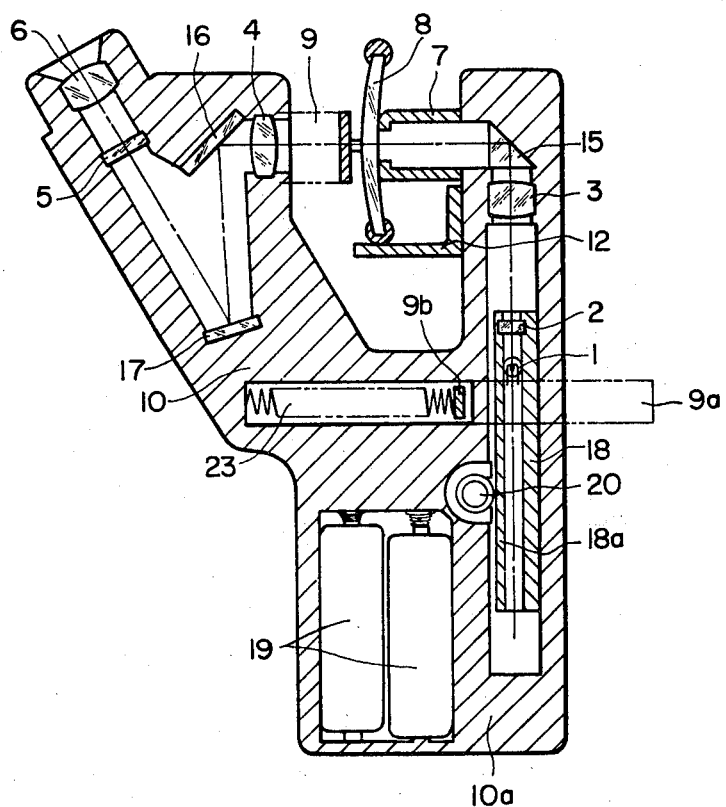
Figure 3:
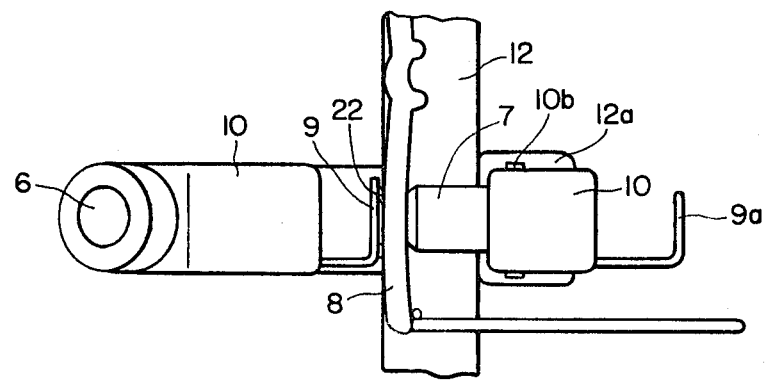
Figure 4:
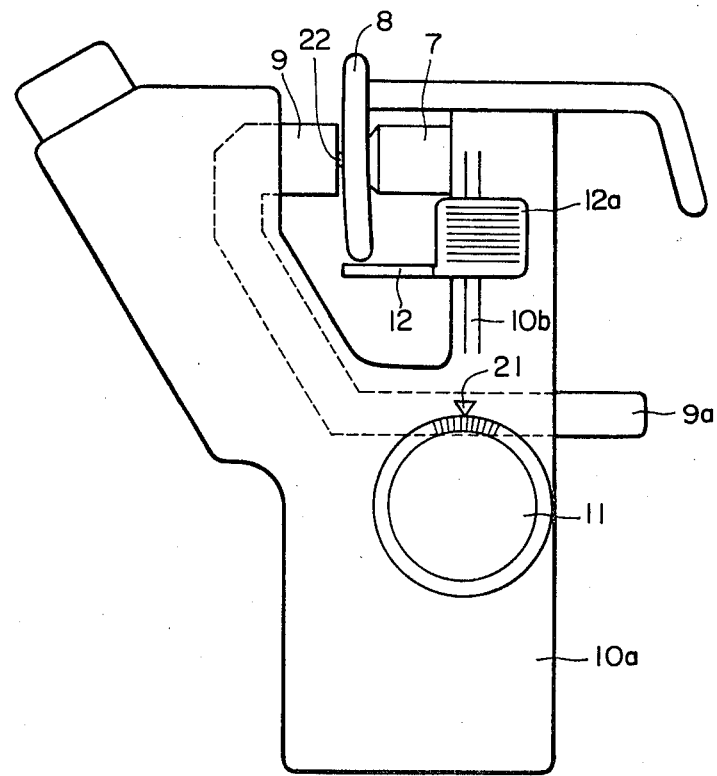
Figure 5:
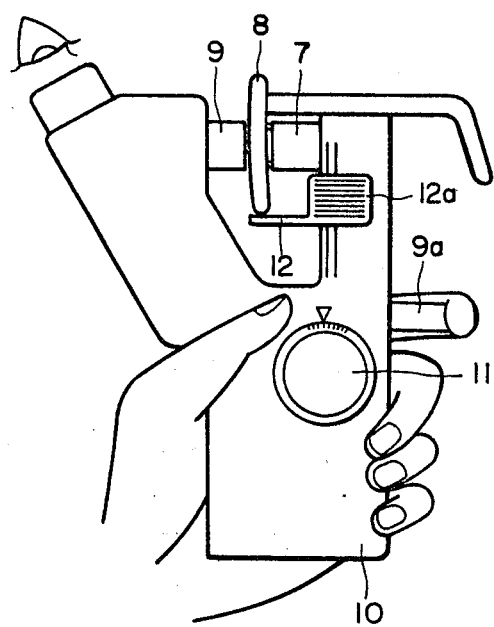

A preferred embodiment of a hand-held lens meter of the invention will be described with reference to FIGS. 2 through 5. FIG. 2 is a sectional side view of an embodiment of the hand-held lens meter. FIG. 3 is a top view thereof, FIG. 4 is a side view thereof, and FIG. 5 is a side view showing the hand-held lens meter in operation.

As shown in FIGS. 2 through 5, there are arranged along the optical axis in the direction of the advancement of light a target 2 having a chart pattern on its surface, an objective lens 3, a prism 15, a lens rest 7, a lens 8 to be measured, a relay lens 4, a first mirror 16, a second mirror 17, a focusing screen 5 and an eyepiece lens 6.

The target 2 is fixedly secured to one end of a slider 18 which is slidably disposed in the body 10 in the optical axis direction. The optical axis is bent at a right angle by the prism 15 and is then bent by the first mirror 16 so as to be substantially parallel to the optical axis of the target 2 and the objective lens 3. The optical axis thus bent is further bent by the second mirror 17 to extend along a path beside the first mirror 16 thus reaching the eyepiece lens 6. It should be noted that the optical axis thus bent three times still lies in a single plane. Provided behind the target 2 is a light source 1 which is secured to the slider 18 and whose function is to illuminate the target 2.

The slider 18 is slidably inserted into the body 10 as described above and the objective lens 3, prism 15, relay lens 4, first mirror 16, second mirror 17, focusing screen 5 and eyepiece 6 are fixedly secured in the body. The body 10 has a space to receive the lens 8 to be measured. The lens rest 7 protrudes from a side of the body 10. A grip 10a, formed as a part of the body, is located below this space. Thus, the body 10 is substantially Y-shaped. The objective lens 3 and the prism 15 are located in one of the two branches which form the forked portion of the Y-shaped body 10 and the optical system from the relay lens 4 to the eyepiece lens 6 are located in the other branch. The lens rest 7 and the lens 8 to be measured are positioned in the space between the two branches. The two branches are joined together at the region from which the grip 10a extends. The slider 18 is provided generally in the grip portion. A chamber is provided in the grip portion in which dry cells 19 are located. The dry cells 19 are electrically connected to the light source 1. One side of the slider is provided with a rack 18a which is engaged with a pinion 20 which is rotatably supported by the grip 10a. A power-measuring dial 11 provided on one side of the grip 10a is coupled to the pinion 20. Marks indicating the powers of lenses to be measured are graduated on the periphery of the power-measuring dial 11 confronting an index 21 provided on the grip 10a.

Next, a mechanism for holding a lens 8 to be measured will be described. In the body 10 the lens holder 9 is coupled on the side of the optical system in such a manner as to be slidable parallel to the optical axis in the lens rest 7. One end of the lens holder 9 protrudes towards the lens rest 7 from the relay lens 4 side while the other end protrudes from the upper portion of the grip 10a, more specifically from the slider 18 side, thus forming a finger-operated member 9a which can be pushed with the finger. A tip 22 made of elastic material is bonded to the end of the lens holder 9 which contacts the lens 8 to be measured so as to protect the lens 8 from damage. Furthermore, a spring 23 is provided in the body 10. The spring 23 has a spring fastening portion 9b which is integral with the lens holder 9 through which a force is transmitted to urge the lens holder 9 towards the lens rest 7 thereby to hold the lens 8 between the lens rest 7 and the lens holder 9.

The lens supporting plate 12 and its relevant components for positively holding the lens 8 to be measured will be described. Two belt-shaped slide protrusions 10b are formed on two sides of the body 10 which are near the objective lens 3 with the slide protrusions 10b being parallel to the optical axis of the objective lens 3. The lens supporting plate 12 is an elongated plate whose length is about twice as long as the pupillary distance of an ordinary ophthalmic lens. The lens supporting plate 12 has a U-shaped mounting portion 12a at the center thereof. Grooves are formed in the inner wall of the U-shaped mounting portion 12a and the slide protrusions 10b are engaged with the grooves thus formed. The lens supporting plate 12 protrudes perpendicularly to the body 10 and is positioned below the lens 8 to be measured.

The operating procedure of the lens meter according to the invention will be described with reference to FIGS. 2 through 5.

(1) The grip 10a is held with the left hand with the eyepiece 6 directed towards the operator.

(2) The finger-operated part 9a is pushed with the left hand index finger against the elastic force of the spring 23 to move the lens holder 9 apart from the lens rest 7.

(3) The lens 8 to be measured is placed on the lens rest 7 with the right hand with the frame of the pair of spectacles being opposite to the eyepiece 6. Under this condition, the left hand index finger is released to cause the lens holder 9 to grasp and hold the lens 8 to be measured.

(4) The mounting portions 12a of the lens supporting plate 12 are slid with the right hand until the lens supporting plate 12 abuts against the edge of the lens 8 to be measured to support the latter.

(5) The power-measuring dial 11 is turned with the right hand to move the target 2 until the image of the target 2 is formed.

(6) The spherical power and the cylindrical power of the lens 8 to be measured are read from the scale on the dial 11 and the orientation of the cylinder axis and the prism power are read from the image in the field of vision which is observed through the eyepiece 6.

As described above, the left hand is used to hold the lens meter and operates the lens holder 9 while the right hand is used to place the lens 8 to be measured, slide the lens supporting plate 12 and turn the power-measuring dial. The image is observed through the eyepiece 6.

The action of the prism 15 will now be described. In the lens meter, the lens rest 7 is, in general, so positioned that the focus of the objective lens 3 coincides substantially with the back vertex of the lens 8 to be measured whereby the value of a power is in linear correspondence with the position of the target 2. That is, the distance between the principal points of the objective lens 3 and the lens 8 to be measured is substantially determined by the focal length of the objective lens 3. In general, a spectacle lens is meniscus shaped. Therefore, the periphery of the spectacle lens may come into contact with the lens meter if it is not possible to achieve focusing with sufficiently long distance between the objective lens 3 and the lens 8 to be measured. However, if an objective lens 3 having a longer focal distance is used in order to eliminate this difficulty, then another problem is caused that the range of measurable powers is decreased. With the provision of the prism 15, glass or plastic can be filled between the objective lens 3 and the lens rest 7 in order to increase the distance therebetween and to minimize the focal distance of the objective lens 3 and to thereby increase the range of measurable powers. That is, due to the provision of the prism 15, a space large enough to receive an opthalmic lens is provided in the lens meter and the optical arrangement is made substantially L-shaped.

The actions of the mirrors 16 and 17 will be described. If the mirrors 16 and 17 are not provided, the telescopic system is considerably lengthened making the instrument bulky. The provision of the mirrors 16 and 17 makes it possible to make the instrument quite compact. Moreover, the mirrors 16 and 17 reflect light twice to eliminate the inversion of an image, which is an action equivalent to that in a conventional aligned lens meter.

Figure 6:
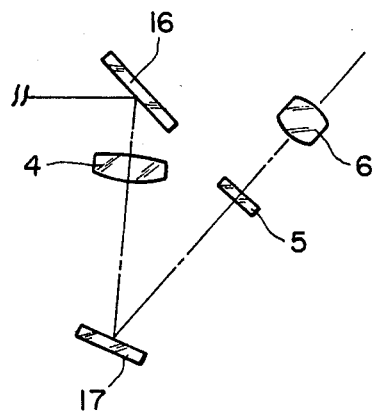
FIG. 6 is a sectional view showing an alternate arrangement of some of the components in the lens meter of FIG. 2.

An alternate arrangement is shown in FIG. 6. In this embodiment, the relay lens 4 is inserted between the mirrors 16 and 17. The actions of the mirrors 16 and 17 are completely the same as those of the mirrors 16 and 17 in the embodiment of FIG. 2.

Figure 7:
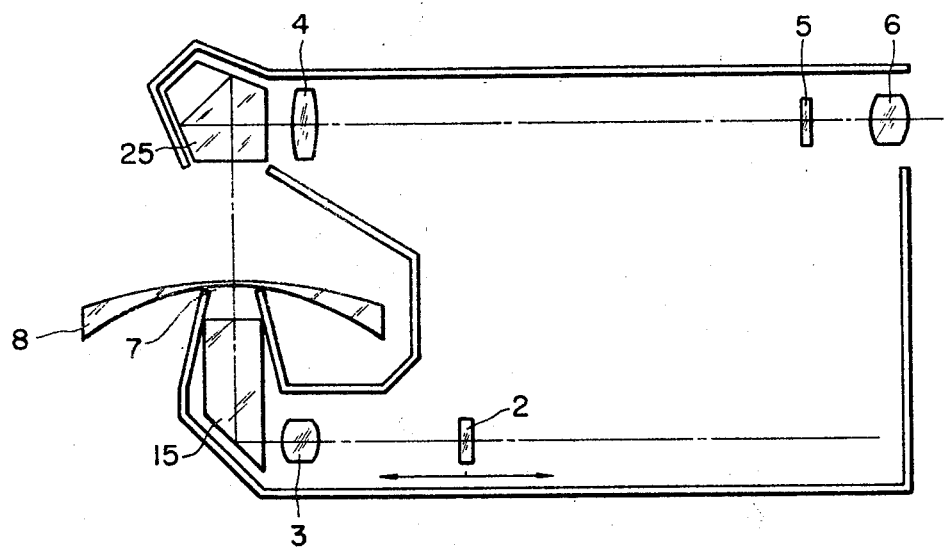
FIG. 7 is a sectional schematic view showing an alternate embodiment of a lens meter of the invention.
Figure 8:
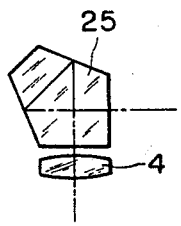
FIGS. 8 and 9 are sectional views showing alternate arrangements of portions of the lens meter of FIG. 7.
Figure 9:
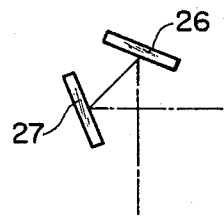

FIG. 7 shows schematically a third embodiment of a lens meter according to the invention. The third embodiment is constructed by employing a pentagonal prism 25 instead of the mirrors 16 and 17 in the FIG. 2 embodiment. The action of the pentagonal prism 25 is equivalent to the actions of the mirrors 16 and 17. The action of the pentagonal prism 25 is not be affected at all by the position of the relay lens 4 and the position thereof shown in FIG. 8 can be used as well as that of FIG. 7. Furthermore, the same effect can be obtained by replacing the pentagonal prism 25 by mirrors 26 and 27 as shown in FIG. 9.

The L-shaped optical arrangement is obtained by the provision of the prism 15. Therefore, if a grip is formed so as to surround the area in which the target 2 is located, the optician can operate the lens meter by holding it with his hand and troublesome contact of the spectacle sidepieces with the hand is prevented.

As is apparent from the above description, the lens meter according to the invention is small in size and light weight. Therefore, the lens meter can be carried with ease. Accordingly, the optician can easily carry the instrument with him to a customer or he can use it just as readily in his shop or any other desired location. As the arrangement of the body and the operating members is suitably designed according to the invention, measurements can be carried out with the lens meter held in one hand. Thus, it is unnecessary to use a table or the like to perform the measurement.

What is claimed is:

1. A hand-held lens meter comprising: a target; an objective lens; a lens rest adapted to receive a lens to be measured; a relay lens, a focusing screen and an eyepiece lens disposed along an optical axis which is folded between said objective lens and said eyepiece lens; a power-measuring dial operatively coupled to slidably move said target along said optical axis; reflecting means disposed between said lens rest and said focusing screen for reflecting light an even number of times; and a prism creating an optical path length longer than the diameter of said objective lens and having at least one light reflecting surface, said prism being disposed between said lens rest and said objective lens; and means for mounting said target objective lens, lens rest, relay lens, focusing screen, eyepiece lens, reflecting means and prism so that said lens meter can be held with the hand.

2. The hand-held lens meter as claimed in claim 1 in which said reflecting means comprises two mirrors.

3. The hand-held lens meter as claimed in claim 1 in which said reflecting means comprises a pentagonal prism.

4. A hand-held lens meter comprising:
a first optical system comprising a target, an objective lens, a lens rest and a first reflecting surface between said target and said lens rest;
a second optical system comprising an eyepiece lens, a focusing screen, a relay lens and second and third reflecting surfaces positioned between said lens rest and said eyepiece leus;
a substantially Y-shaped body for holding said first and second optical systems, said body being outwardly shaped to receive a lens to be measured and said body having a grip section including a target sliding member below said first hollow portion and an inner hollow portion adapted for receiving a power source;
a power-measuring dial rotatably mounted on one side of said body and operatively coupled to cause said target sliding member to slidably move in response to rotation of said power-measuring dial, said power-measuring dial having marks corresponding to powers of lenses to be measured on a peripheral portion thereof; and
a lens holder slidably mounted on said body having a first end protruding to confront said lens rest and a second end protruding from an upper part of said grip section, said lens holder being elastically urged to retain said lens to be measured.

5. The hand-held lens meter as claimed in claim 4 further comprising a lens supporting plate engaged with said body slidable perpendicular to the optical axis of said lens to be measured, said lens supporting plate having a flat portion protruding perpendicularly to a side of said body.

6. The hand-held lens meter as claimed in claim 4 further comprising a light source mounted on said target sliding member, said light source being operatively coupled to a power source.

7. The hand-held lens meter as claimed in claim 4 wherein said relay lens is positioned between said lens holder and said second reflecting surface.

8. The hand-held lens meter as claimed in claim 4 wherein said relay lens is positioned between said second and third reflecting surfaces.

9. The hand-held lens meter as claimed in claim 4 wherein said second and third reflecting surfaces comprise mirrors.

10. The hand-held lens meter as claimed in claim 4 wherein said second and third reflecting surfaces comprise surfaces of a pentagonal prism.

11. The hand-held lens meter as claimed in claim 4 wherein said first optical system comprises an objective lens disposed adjacent said first reflecting surface.

12. The hand-held lens meter as claimed in claim 4 wherein said first reflecting surface comprises a prism.

13. The hand-held lens meter as claimed in claim 12 wherein said prism creates an optical path longer than the diameter of said objective lens.

* * * * *